(12) United States Patent
Sonie

(10) Patent No.: US 9,483,550 B1
(45) Date of Patent: Nov. 1, 2016

(54) METHOD AND SYSTEM TO ENHANCE E-DISCOVERY BY CUSTODIAN RANKING

(75) Inventor: Omprakash Nawalkishore Sonie, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 441 days.

(21) Appl. No.: 13/484,619

(22) Filed: May 31, 2012

(51) Int. Cl.
*G06F 17/30* (2006.01)
*G06Q 10/10* (2012.01)

(52) U.S. Cl.
CPC ..... *G06F 17/30663* (2013.01); *G06F 17/3053* (2013.01); *G06F 17/30616* (2013.01); *G06F 2216/03* (2013.01); *G06Q 10/107* (2013.01)

(58) Field of Classification Search
CPC ............. G06F 17/3053; G06F 17/30616; G06F 17/30699; G06F 7/00; G06F 17/30572; G06F 2216/03; G06F 17/30867; G06F 17/30864; G06F 17/30554; G06F 17/30011; G06F 17/27; G06F 17/277; G06F 17/278; G06F 17/30663; Y10S 707/912; Y10S 707/933; Y10S 707/9993; G06K 9/00442; G06Q 10/107; G06Q 50/01; G06Q 50/18; H04L 67/22; H04L 43/08; H04L 51/16
USPC ................................. 707/722, 776
See application file for complete search history.

(56) References Cited

U.S. PATENT DOCUMENTS

| | | |
|---|---|---|
| 7,593,995 B1 | 9/2009 | He et al. |
| 7,743,051 B1 * | 6/2010 | Kashyap et al. ............. 707/713 |
| 8,090,705 B1 | 1/2012 | Panse |
| 9,165,305 B1 * | 10/2015 | Chandra ........... G06F 17/30041 |
| 2006/0064404 A1 * | 3/2006 | Kishore ............ G06F 17/30657 |
| 2010/0250455 A1 * | 9/2010 | Richards ................ G06Q 10/10 705/311 |
| 2010/0306185 A1 * | 12/2010 | Smith .................. G06Q 10/107 707/709 |
| 2012/0310951 A1 * | 12/2012 | Kumar et al. ................ 707/749 |

OTHER PUBLICATIONS

Symantec Corporation, "Clearwell eDiscovery Platform™—Data Sheet: Archiving and eDiscovery," 2011, 7 pages.
Symantec Corporation, "Symantec Archiving and eDiscovery—Solution Overview: Archiving and eDiscovery," 2011, 4 pages.
Symantec Corporation, "Symantec Enterprise Vault™ Discovery Accelerator—Data Sheet: Archiving and eDiscovery," 2011, 4 pages.

* cited by examiner

*Primary Examiner* — Evan Aspinwall
(74) *Attorney, Agent, or Firm* — Wilmer Cutler Pickering Hale and Dorr LLP

(57) ABSTRACT

Custodians of ESI are ranked depending upon the involvement of the custodians with the ESI. The term weights of terms are enhanced based upon the custodian ranking. More particularly, terms appearing in items of the ESI having a high calculated weight, i.e., for which important custodians were involved, are given more term weight than terms appearing in items having a low calculated weight, i.e., for which less important custodians were involved. This optimizes the e-discovery by allowing an early decision to be made of whether to settle the matter or to continue with the review process.

20 Claims, 6 Drawing Sheets

| CUSTODIAN | WEIGHT |
|---|---|
| Custodian B | 1.0 |
| Custodian A | 0.5 |
| Custodian C | 0.1 |

| TERM | ENHANCED TERM WEIGHT |
|---|---|
| Diamond | 1.0 |
| Earning | 0.7 |

METHOD AND SYSTEM TO ENHANCE E-DISCOVERY BY CUSTODIAN RANKING

BACKGROUND

1. Field of the Invention

The present application relates to data processing. More particularly, the present application relates to a method and system for processing electronically stored information for electronic discovery.

2. Description of the Related Art

The discovery of material to be exchanged among parties as part of a discovery process provides significant challenges, particularly with respect to electronically stored information (ESI). Discovery of ESI is sometimes called eDiscovery or e-Discovery.

Often there are hundreds of thousands of items of ESI that must be searched during e-Discovery. To minimize the time and cost of e-Discovery, it is desirable to locate relevant items quickly and efficiently.

SUMMARY

Custodians of ESI are ranked depending upon the involvement of the custodians with the ESI. The term weights of terms are enhanced based upon the custodian ranking. More particularly, terms appearing in items of the ESI having a high calculated weight, i.e., for which important custodians were involved, are given more term weight than terms appearing in items having a low calculated weight, i.e., for which less important custodians were involved. This optimizes the e-discovery by allowing an early decision to be made of whether to settle the matter or to continue with the review process.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 3:
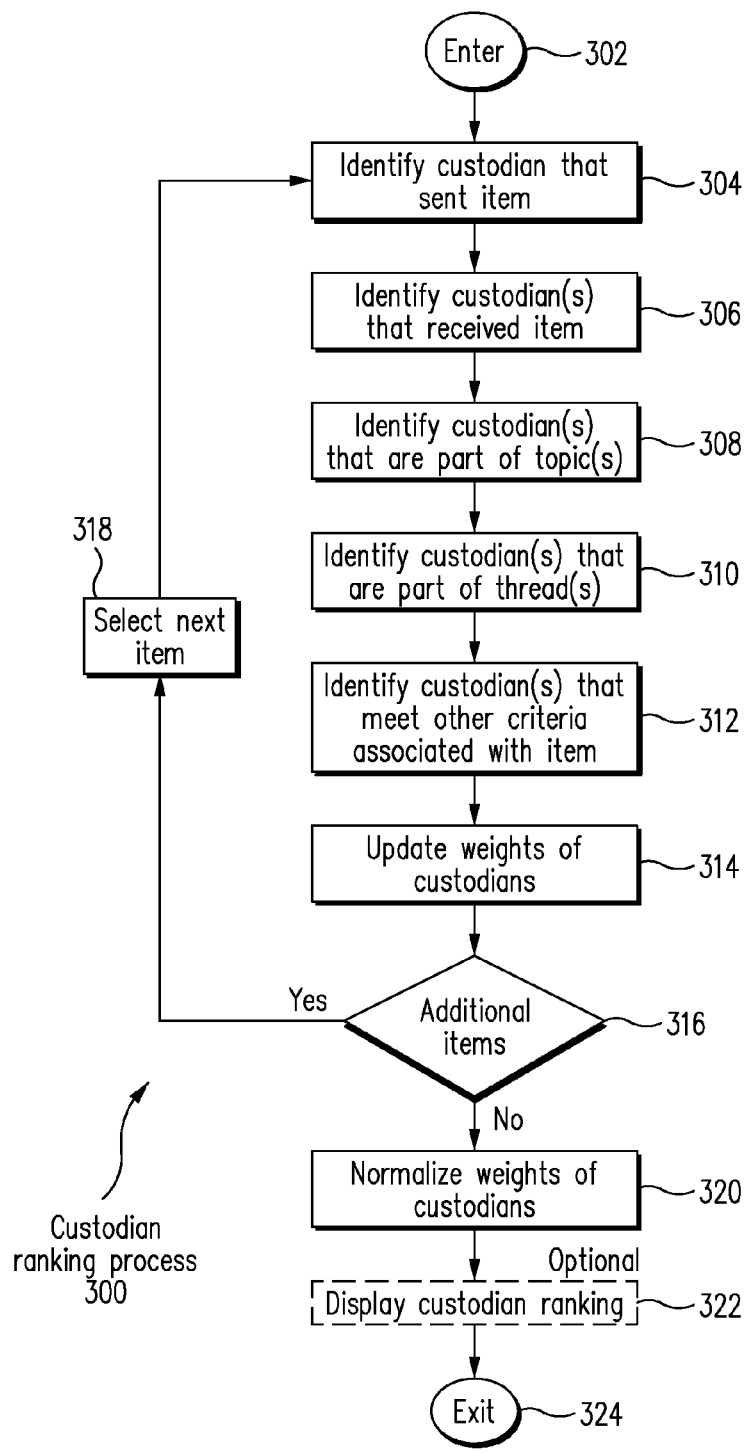
FIG. 3 is a flow diagram of a custodian ranking process in accordance with one embodiment.

As an overview and in accordance with one embodiment, custodians of electronically stored information (ESI) are ranked depending upon the involvement of the custodians with the ESI during a custodian ranking process 300 of FIG. 3. The term weights of terms are enhanced based upon the custodian ranking during a process 500 of FIG. 5.

More particularly, terms appearing in items of the ESI having a high calculated weight, i.e., for which important custodians were involved, are given more term weight than terms appearing in items having a low calculated weight, i.e., for which less important custodians were involved.

By enhancing the term weights of terms based upon the custodian ranking, the review of important items early in the review cycle is prioritized. This optimizes the e-discovery by allowing an early decision to be made as to whether to settle the matter or to continue with the review process.

Figure 1:
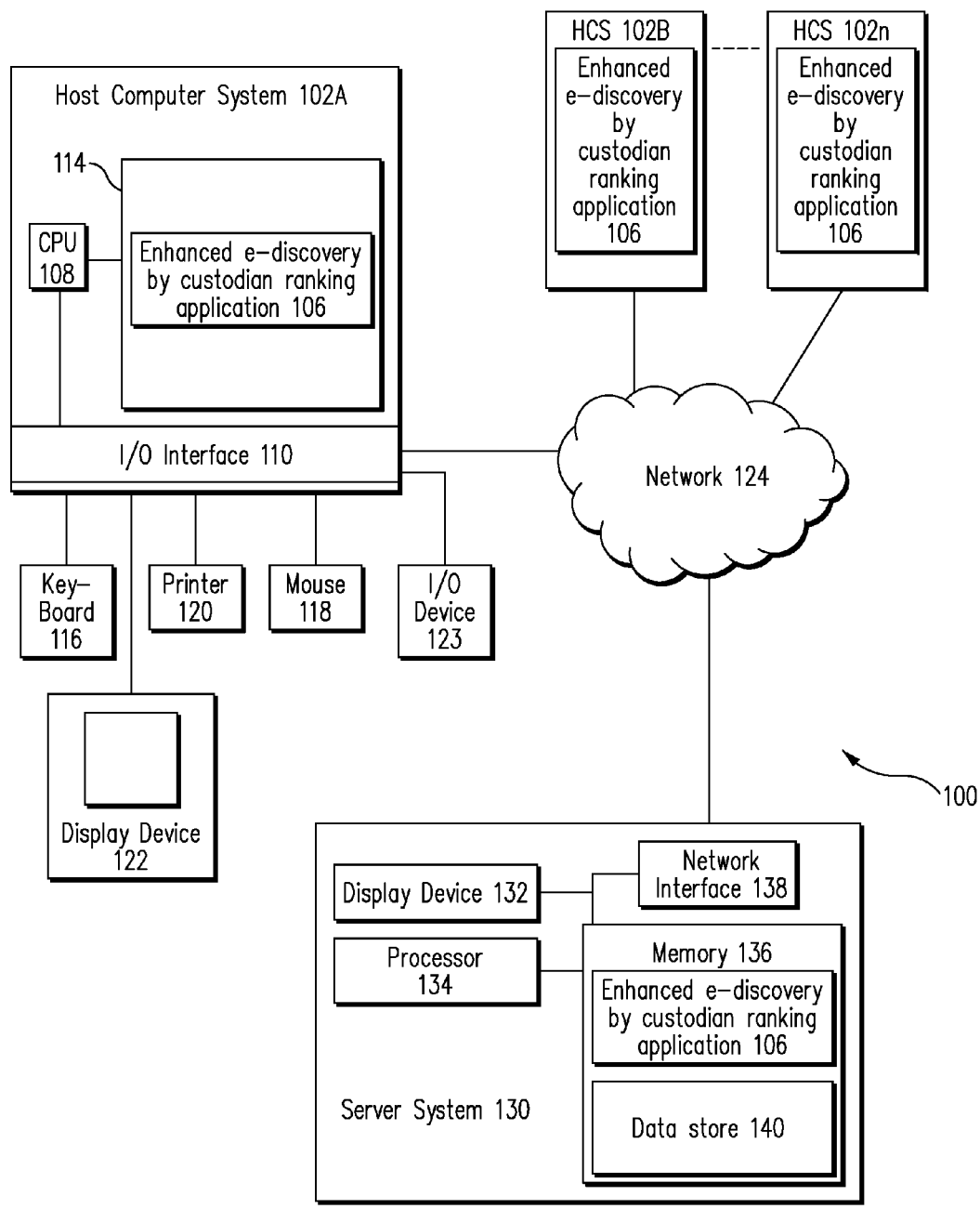
FIG. 1 is a diagram of a client-server system that includes an enhanced e-discovery by custodian ranking application executing on a host computer system in accordance with one embodiment.

Now in more detail, FIG. 1 is a diagram of a client-server system 100 that includes an enhanced e-discovery by custodian ranking application 106 executing on a host computer system 102A in accordance with one embodiment.

Host computer system 102A, sometimes called a client or user device, typically includes a central processing unit (CPU) 108, sometimes called a processor 108, an input/output (I/O) interface 110, and a memory 114. Host computer system 102A further includes standard devices like a keyboard 116, a mouse 118, a printer 120, and a display device 122, as well as one or more standard input/output (I/O) devices 123, such as a compact disk (CD) or DVD drive, hard disk, floppy disk drive, or other digital or waveform ports for inputting data to and outputting data from host computer system 102A.

In one embodiment, enhanced e-discovery by custodian ranking application 106 is loaded into host computer system 102A via I/O device 123, such as from a CD, DVD, or floppy disk containing enhanced e-discovery by custodian ranking application 106.

Host computer system 102A is coupled to a plurality of host computer systems 102B, . . . , 102n similar to host computer system 102A by a network 124. Host computer systems 102A, . . . , 102n are sometimes referred to collectively as host computer systems 102.

Host computer system 102A is further coupled to a server system 130 of computer system 100 by network 124. Server system 130 typically includes a display device 132, a processor 134, a memory 136, and a network interface 138.

Network 124 can be any network or network system that is of interest to a user. In various embodiments, network interface 138 and I/O interface 110 include analog modems, digital modems, wireless modems, or a network interface card.

Enhanced e-discovery by custodian ranking application 106 is stored, for example, in memory 114 of host computer system 102A and executed on host computer system 102A. In one embodiment, one or more of host computer systems 102 store and execute enhanced e-discovery by custodian ranking application 106.

For example, execution of enhanced e-discovery by custodian ranking applications 106 on host computer systems 102 causes collection of electronically stored information (ESI) on host computer systems 102. In one embodiment, the collected ESI is forwarded to server system 130 and stored in a data store 140, sometimes called a repository, in memory 136 of server system 130. Examples of ESI include e-mail messages, instant messaging (IM) messages, documents, SharePoint, databases, and any other types of data of interest.

The collection of ESI from a wide variety of different types of computer systems can be accomplished using any one of a number of techniques, and the particular technique used is not essential to this embodiment.

Host computer systems 102 can be any collection of computer systems that contain ESI. For example, host computer systems 102 include portable computers, workstations, two-way pagers, cellular telephones, digital wireless telephones, personal digital assistants, server computers, e-mail servers, Internet appliances, or any other device that contain ESI. The particular type of and configuration of host computer systems 102 and server system 130 are not essential to this embodiment.

Further, in this embodiment, server system 130 includes enhanced e-discovery by custodian ranking application 106 in memory 136. For example, after collection of the ESI within data store 140, execution of enhanced e-discovery by custodian ranking applications 106 on server system 130 causes performance of the processes as set forth below on the collection of ESI.

Figure 2:
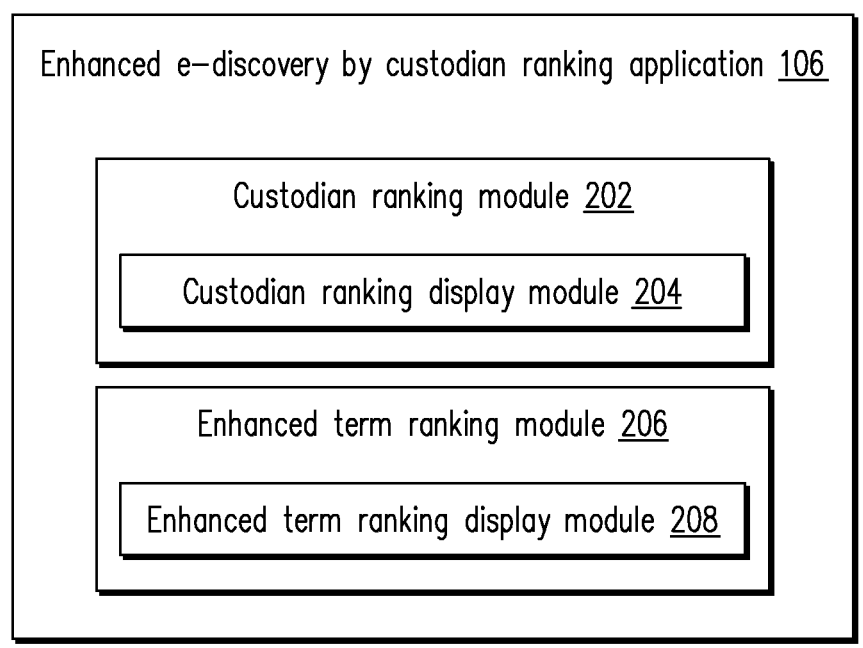
FIG. 2 is a block diagram of the enhanced e-discovery by custodian ranking application of FIG. 1 in accordance with one embodiment.

FIG. 2 is a block diagram of enhanced e-discovery by custodian ranking application 106 of FIG. 1 in accordance with one embodiment. Enhanced e-discovery by custodian ranking application 106 includes a custodian ranking module 202, a custodian ranking display module 204, an enhance term ranking module 206, and an enhanced term ranking display module 208. Although modules 202, 204, 206, 208 are illustrated in FIG. 2 and discussed herein, in light of this disclosure, those of skill in the art will understand that enhanced e-discovery by custodian ranking application 106 includes more or less modules in other embodiments.

In one embodiment, custodian ranking module 202 includes procedures, data, and/or instructions, for implementing and operating a custodian ranking process, such as custodian ranking process 300 as discussed below in reference to FIG. 3.

Custodian ranking display module 204 includes procedures, data, and/or instructions, for implementing and operating a custodian ranking display process, such as DISPLAY CUSTODIAN RANKING OPERATION 322 as discussed below in reference to FIGS. 3 and 4.

Enhance term ranking module 206 includes procedures, data, and/or instructions, for implementing and operating an enhance term weights based on custodian ranking process, such as enhance term weights based on custodian ranking process 500 as discussed below in reference to FIG. 5.

Enhance term ranking display module 208 includes procedures, data, and/or instructions, for implementing and operating a term ranking display process, such as DISPLAY ENHANCED TERM RANKING OPERATION 520 as discussed below in reference to FIGS. 5 and 6.

FIG. 3 is a flow diagram of a custodian ranking process 300 in accordance with one embodiment. Referring now to FIGS. 1, 2, and 3 together, in one embodiment, execution of enhanced e-discovery by custodian ranking application 106, e.g., custodian ranking module 202, by processor 134 of server system 130 results in the operations of custodian ranking process 300 as described below.

From an ENTER OPERATION 302, flow moves to an IDENTIFY CUSTODIAN THAT SENT ITEM OPERATION 304. In IDENTIFY CUSTODIAN THAT SENT ITEM OPERATION 304, the custodian that sent the item being inspected is identified.

In one embodiment, a custodian is the entity that guarded, protected, or otherwise had access to the item. In one embodiment, a custodian is a person, i.e., a human being.

An item is a separate identifiable piece of ESI. Examples of an item include an e-mail message, an instant messaging (IM) message, a document, a database, and any other type of identifiable piece of ESI of interest. For simplicity, the item shall be discussed as an e-mail message. However, it is to be understood that the discussion is simply illustrative and that the discussion is equally applicable to items other than e-mail messages.

The item can be one of all the ESI. Alternatively, the item can be one of a subset of the ESI. For example, a subset of the ESI is defined using a concept search.

Referring again to IDENTIFY CUSTODIAN THAT SENT ITEM OPERATION 304, in this example, assume that the item is an e-mail message. The custodian, e.g., person, that sent the e-mail is identified. A custodian can send an e-mail message in a variety of ways, e.g., can compose the e-mail message, forward the e-mail message, and/or reply to the e-mail message.

Typically, a custodian that sends an e-mail is interested in the content of the e-mail. Accordingly, the custodian that sent the e-mail is identified and a weight is given to the custodian for sending the e-mail.

In this example, assume that a custodian A sent the e-mail. Custodian A is identified and the weight of custodian A is increased for sending the e-mail.

From IDENTIFY CUSTODIAN THAT SENT ITEM OPERATION 304, flow moves to an IDENTIFY CUSTODIAN(S) THAT RECEIVED ITEM OPERATION 306. In IDENTIFY CUSTODIAN(S) THAT RECEIVED ITEM OPERATION 306, one or more custodians that received the e-mail are identified.

Typically, a custodian is sent an e-mail because presumably the custodian will be interested in the content of the e-mail. Accordingly, the custodian that received the e-mail is identified and a weight is given to the custodian for receiving the e-mail.

In this example, assume that custodian A sent the e-mail to custodians B and C. Custodians B, C are identified as receiving the e-mail and the weights of custodians B, C are increased for receiving the e-mail.

For example, the weight of custodian A is increased by 1.0 for sending the e-mail. Further, the weights of custodians B, C are increased by 0.5 for receiving the e-mail.

In accordance with this illustration, it is presumed that the act of sending an e-mail shows a greater interest in the e-mail than the act of receiving the e-mail. For example, the custodian that receives the e-mail may have no interest in the e-mail and so receives a lower weight adjustment. Although particular weight adjustments are set forth, the weight adjustments are configurable depending upon the particular application.

From IDENTIFY CUSTODIAN(S) THAT RECEIVED ITEM OPERATION 306, flow moves to an IDENTIFY CUSTODIAN(S) THAT ARE PART OF TOPIC(S) OPERATION 308. In IDENTIFY CUSTODIAN(S) THAT ARE PART OF TOPIC(S) OPERATION 308, custodians that are part of the topic or topics associated with the e-mail are identified.

In one embodiment, the topic is the subject of the e-mail. The topic may be determined from the subject header or in response to the content of the body of the e-mail message or otherwise as those of skill in the art will understand in light of this disclosure.

Typically, a custodian that is part of topic(s) of an e-mail is interested in the content of the e-mail. Accordingly, the custodian that is part of the topic(s) of the e-mail is identified and a weight is given to the custodian for being part of the topic(s).

From IDENTIFY CUSTODIAN(S) THAT ARE PART OF TOPIC(S) OPERATION 308, flow moves to an IDEN- TIFY CUSTODIAN(S) THAT ARE PART OF THREAD(S) OPERATION 310. In IDENTIFY CUSTODIAN(S) THAT ARE PART OF THREAD(S) OPERATION 310, custodians that are part of the thread or threads associated with the e-mail are identified.

In one embodiment, the thread is a series or sequence of one or more e-mails or other messages that form a logical "discussion" or "communication." Messages can be related by thread criteria, such as time, sender, topic, etc.

Typically, a custodian that is part of thread(s) is interested in the content of the e-mail. Accordingly, the custodian that is part of the thread(s) of the e-mail is identified and a weight is given to the custodian for being part of the thread(s).

From IDENTIFY CUSTODIAN(S) THAT ARE PART OF THREAD(S) OPERATION 310, flow moves to an IDENTIFY CUSTODIAN(S) THAT MEET OTHER CRITERIA ASSOCIATED WITH ITEM OPERATION 312. In IDENTIFY CUSTODIAN(S) THAT MEET OTHER CRITERIA ASSOCIATED WITH ITEM OPERATION 312, custodians that meet other criteria associated with the e-mail are identified. A criteria is any parameter which can enhance the value of an item for eDiscovery.

In one embodiment, the criteria is configurable. For example, it may be important to identify which custodians performed certain actions with an e-mail. These actions can be specified as criteria and thus any custodian that meets the criteria is identified and a weight is given to the custodian for meeting the criteria.

From IDENTIFY CUSTODIAN(S) THAT MEET OTHER CRITERIA ASSOCIATED WITH ITEM OPERATION 312, flow moves to an UPDATE WEIGHTS OF CUSTODIANS OPERATION 314. In UPDATE WEIGHTS OF CUSTODIANS OPERATION 314, the weights of the custodians identified in OPERATIONS 304, 306, 308, 310, and/or 312 are updated. In one embodiment, the weights of the custodians are incremented with the weights given to the custodians in OPERATIONS 304, 306, 308, 310, and/or 312.

From UPDATE WEIGHTS OF CUSTODIANS OPERATION 314, flow moves to an ADDITIONAL ITEMS CHECK OPERATION 316. In ADDITIONAL ITEMS CHECK OPERATION 316, a determination is made as to whether there are additional items to be analyzed. If a determination is made in ADDITIONAL ITEMS CHECK OPERATION 316 that there are additional items to be analyzed, flow moves to a SELECT NEXT ITEM OPERATION 318.

In SELECT NEXT ITEM OPERATION 318, the next item to be analyzed is selected. For example, a second item of the collection of items that form the ESI is selected. OPERATIONS 304, 306, 308, 310, 312, 314 are performed upon this next selected item to identify and update the weights of the custodians associated with the item.

OPERATIONS 304, 306, 308, 310, 312, 314, 316, 318 are repeatedly performed for each item of ESI to identify and update the weights of the custodians.

After analysis of each item is complete, a determination is made that there are no additional items in ADDITIONAL ITEMS CHECK OPERATION 316, and flow moves to a NORMALIZE WEIGHTS OF CUSTODIANS OPERATION 320. At this point, in one embodiment, it is known how many messages were sent, e.g., composes, forwarded, and/or replied to, by a custodian, how many messages were received by a custodian, how many topics a custodian was a part of, how many threads a custodian was a part of, and/or how many criteria the custodian met.

In NORMALIZE WEIGHTS OF CUSTODIANS OPERATION 320, the weights of the custodians are normalized. For example, as set forth above, in UPDATE WEIGHTS OF CUSTODIANS OPERATION 314, the weights of the identified custodians are incremented. Accordingly, each identified custodian will have a particular weight. These weights are normalized in NORMALIZE WEIGHTS OF CUSTODIANS OPERATION 320.

For purposes of illustration, assume that custodian A has a weight of 500, custodian B has a weight of 1000, and custodian C has a weight of 100. The weights of each custodian A, B, C are normalized by dividing the weight of the custodian by the highest weight.

In accordance with this illustration, the normalized weight of custodian A is 500/1000=0.5, the normalized weight of custodian B is 1000/1000=1.0, and the normalized weight of custodian C is 100/1000=0.1.

As custodian B had the highest normalized weight, custodian B is the most important custodian. Custodian A is the next most important custodian, followed by custodian C.

Although one example of normalization is provided above, in other embodiments, the weights are normalized using other techniques. Further, although three custodians are discussed above, in light of this disclosure, those of skill in the art will understand that there can be many custodians, e.g., hundreds or thousands, depending upon the size of the organization and the people involved with the ESI being investigated.

The normalized weights directly correspond to the custodian ranking. More particularly, the custodian that has the highest normalized weight has the highest custodian ranking, followed by the custodian that has the next highest normalized weight, and so forth.

From NORMALIZE WEIGHTS OF CUSTODIANS OPERATION 320, flow moves, optionally, to a DISPLAY CUSTODIAN RANKING OPERATION 322. In DISPLAY CUSTODIAN RANKING OPERATION 322, the custodian ranking is displayed, for example, on display device 132 of server system 130. From DISPLAY CUSTODIAN RANKING OPERATION 322, flow moves to and exits at an EXIT OPERATION 324.

Figure 4:
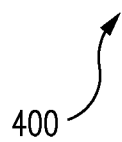
FIG. 4 is a diagram of custodian ranking as displayed in a DISPLAY CUSTODIAN RANKING OPERATION of the custodian ranking process of FIG. 3 in accordance with one embodiment.

FIG. 4 is a diagram 400 of custodian ranking as displayed in DISPLAY CUSTODIAN RANKING OPERATION 322 of custodian ranking process 300 of FIG. 3 in accordance with one embodiment.

Recall that in the simple illustration above, the normalized weight of custodian A is 0.5, the normalized weight of custodian B is 1.0, and the normalized weight of custodian C is 0.1. As custodian B had the highest normalized weight, custodian B has the highest custodian ranking, custodian A has the next highest custodian ranking, followed by custodian C.

As illustrated in FIG. 4, custodians A, B, and C are displayed in order of their respective custodian rankings along with their associated respective normalized weights. Accordingly, custodian B is displayed first or at the top, followed by custodian A, followed by custodian C.

As set forth above, custodians are ranked depending upon the custodian's involvement with ESI. This custodian ranking is used to enhance term ranking as discussed below in reference to FIG. 5.

Figure 5:
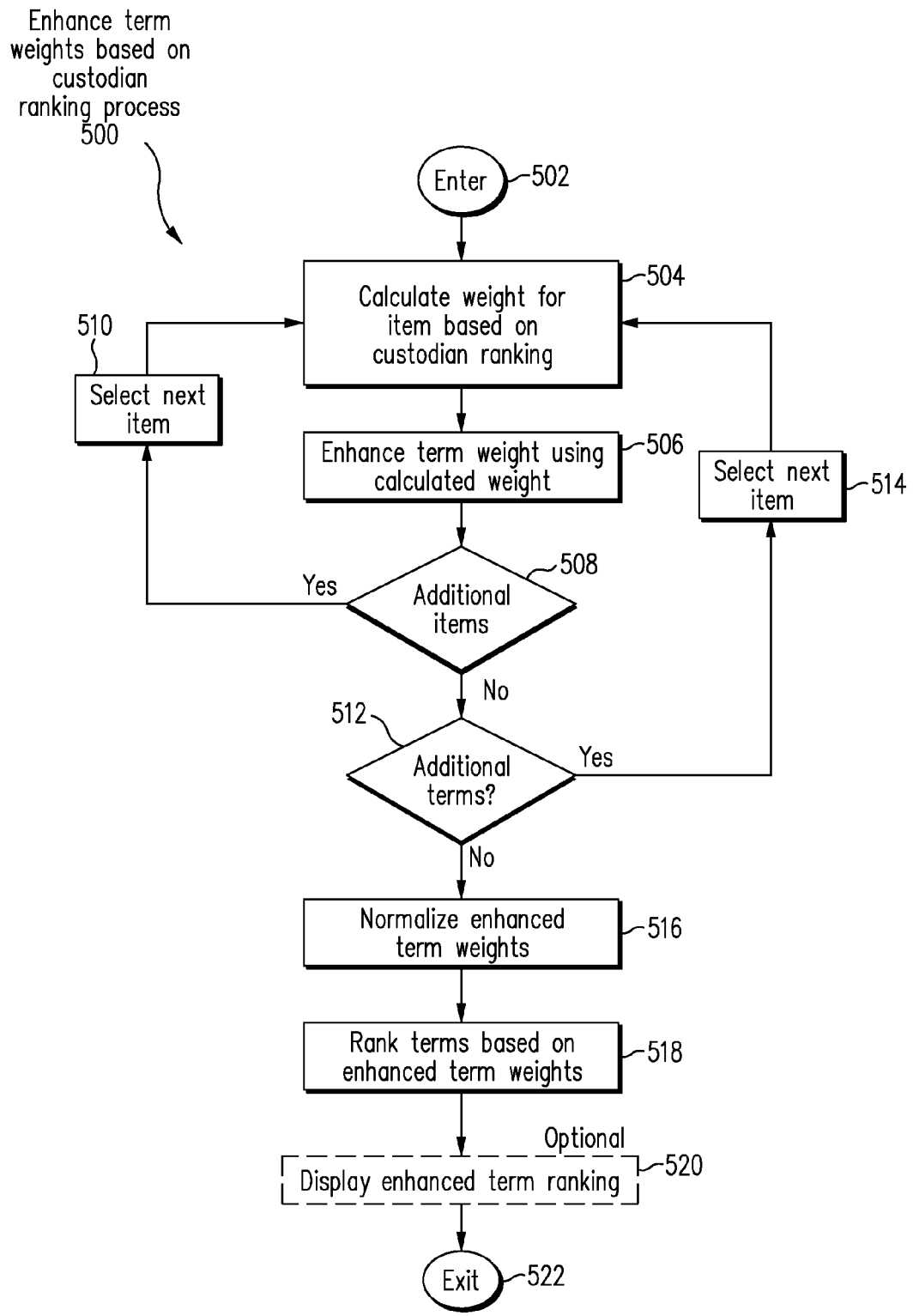
FIG. 5 is a flow diagram of an enhance term weight based on custodian ranking process in accordance with one embodiment.

FIG. 5 is a flow diagram of an enhance term weights based on custodian ranking process 500 in accordance with one embodiment. Referring now to FIGS. 1, 2, and 5 together, in one embodiment, execution of enhanced e-discovery by custodian ranking application 106, e.g., enhance term ranking module 206, by processor 134 of server system 130 results in the operations of enhance term weights based on custodian ranking process 500 as described below.

For example, a collection of terms are selected to determine the term weights for the terms. The term weight is a measure of importance of the term relative to the other terms in the ESI. For example, if a term appears frequently in the ESI, the term will be given a higher ranking than a term that appears infrequently.

As set forth below, the term ranking is enhanced based upon the custodian rankings. Generally, terms that appear in items that have a higher custodian ranking are given a greater term weight than terms that appear in items that have a lower custodian ranking.

Accordingly, an initial term from the collection of terms to be ranked is selected. A first item of the ESI for which the terms shall be ranked is selected. After selection of this initial term and initial item, from an ENTER OPERATION 502, flow moves to a CALCULATE WEIGHT FOR ITEM BASED ON CUSTODIAN RANKING OPERATION 504. In CALCULATE WEIGHT FOR ITEM BASED ON CUSTODIAN RANKING OPERATION 504, the weight for an item is calculated based on the custodian ranking.

In one embodiment, the custodian(s) involved with the item are determined. The custodian rankings of the custodians are determined. Based on the custodian ranking of the custodians involved with the item, the weight, sometimes called the calculated weight, of the item is calculated.

For example, if the custodian ranking of the custodians involved with the item is high, the calculated weight for the item is also high. In accordance with this embodiment, custodians who have been ranked as being important have been involved with the item. Accordingly, the item is deemed to have a greater importance due to the involvement of the important custodians.

Conversely, if the custodian ranking of the custodians involved with the item is low, the calculated weight for the item is also low. In accordance with this embodiment, custodians who have been ranked as being of low importance have been involved with the item. Accordingly, the item is deemed to have a less importance due to the involvement of the less important custodians.

From CALCULATE WEIGHT FOR ITEM BASED ON CUSTODIAN RANKING OPERATION 504, flow moves to an ENHANCE TERM WEIGHT USING CALCULATED WEIGHT OPERATION 506. In ENHANCE TERM WEIGHT USING CALCULATED WEIGHT OPERATION 506, the term weight of the item is enhanced using the calculated weight of the item. Recall the calculated weight was calculated in CALCULATE WEIGHT FOR ITEM BASED ON CUSTODIAN RANKING OPERATION 504.

In ENHANCE TERM WEIGHT USING CALCULATED WEIGHT OPERATION 506, the term weight is increased for items having a high calculated weight and is decreased for items having a low calculated weight. Accordingly, terms appearing in items having a high calculated weight, i.e., for which important custodians were involved, are given more term weight than terms appearing in items having a low calculated weight, i.e., for which less important custodians were involved.

For example, absent any custodian ranking, assume that the term weight for all items is equal, e.g., is equal to 1.0 if the term appears in the item. Accordingly, when the term appears in the item, the term weight for the item being inspected is initially 1.0.

However, if the term appears in the item, and the item has a high calculated weight, the term weight is modified from 1.0 to 1.5 for example. Thus, if the term appears in the item having the high calculated weight, the term weight for the item is 1.5.

Conversely, if the term appears in the item, and the item has a low calculated weight, the term weight is modified from 1.0 to 0.5 for example. Thus, if the term appears in the item having the low calculated weight, the term weight for the item is 0.5.

From ENHANCE TERM WEIGHT USING CALCULATED WEIGHT OPERATION 506, flow moves to an ADDITIONAL ITEMS CHECK OPERATION 508. In ADDITIONAL ITEMS CHECK OPERATION 508, a determination is made as to whether there are additional items to be inspected for the selected term.

If a determination is made that there are additional items in ADDITIONAL ITEMS CHECK OPERATION 508, flow moves to a SELECT NEXT ITEM OPERATION 510. In SELECT NEXT ITEM OPERATION 510, the next item is selected. OPERATIONS 504, 506 are performed upon this next item.

OPERATIONS 504, 506, 508 are repeatedly performed for each item until a determination is made in ADDITIONAL ITEMS CHECK OPERATION 508 that there are no additional items to be inspected for the selected term.

Upon a determination that there are no additional items in ADDITIONAL ITEMS CHECK OPERATION 508, flow moves to an ADDITIONAL TERMS CHECK OPERATION 512. In ADDITIONAL TERMS CHECK OPERATION 512, a determination is made as to whether there are other additional terms which are to be ranked.

Upon a determination that there are additional terms, flow moves from ADDITIONAL TERMS CHECK OPERATION 512 to a SELECT NEXT TERM OPERATION 514. In SELECT NEXT TERM OPERATION 514, the next term to be ranked is selected.

OPERATIONS 504, 506, 508, and 510 are repeated to determine the enhanced term weight for the selected term. OPERATIONS 504, 506, 508, 510, 512, 514 are repeated for each term and each item. Although particular operations and orders are set forth herein, in other embodiments, the above operations can be done in optimized ways.

Upon a determination that there are no additional terms to be inspected, i.e., the enhanced term weight for each term has been calculated, flow moves from ADDITIONAL TERMS CHECK OPERATION 512 to a NORMALIZE ENHANCED TERM WEIGHTS OPERATION 516. In NORMALIZE ENHANCED TERM WEIGHTS OPERATION 516, the enhanced term weights are normalized. In one embodiment, the enhanced term weights are normalized in a manner similar to the normalization of the custodian weights as discussed above regarding NORMALIZE WEIGHTS OF CUSTODIANS OPERATION 320.

From NORMALIZE ENHANCED TERM WEIGHTS OPERATION 516, flow moves to a RANK TERMS BASED ON ENHANCED TERM WEIGHTS OPERATION 518. In RANK TERMS BASED ON ENHANCED TERM WEIGHTS OPERATION 518, the terms are ranked based on the enhanced term weights. For example, the terms having the highest enhanced term weights are given the highest ranking. The terms ranking as based on the custodian ranking is sometimes called the enhanced term ranking.

As a simple illustration, assume that a first term is the word "diamond" and that a second term is the word "earning". Further, assume that the first term "diamond" appears in a single first e-mail message sent from custodian A to custodian B. Further, assume that the second term "earning" appears in a single second e-mail message sent from custodian A to custodian C.

Further, assume the case where the normalized weights of custodian A, B, C are 0.5, 1.0, and 0.1, respectively. Custodians A, B have a higher cumulative custodian ranking than custodians A, C.

As the first e-mail message was sent from custodian A to custodian B, the calculated weight for this first e-mail message is greater than the calculated weight for the second e-mail message that was sent from the lower ranked custodians A, C.

More particularly, both e-mail messages were sent from custodian A. However, the first e-mail message was received by custodian B, and the second e-mail message was received by custodian C, where custodian B has a higher custodian ranking than custodian C. Accordingly, the calculated weight for this first e-mail message is greater than the calculated weight for the second e-mail message, see OPERATION 504.

As the first term "diamond" appeared in the first e-mail message having a greater calculated weight, the term "diamond" is given a greater term weight than the term "earning" that appeared in the second e-mail message, see operation 506. Note that in the absence of the enhanced term weight given to the terms "diamond" and "earning" based on the custodian ranking, the terms would have an equal term weight.

As the term weight of the term "diamond" is greater than the term weight of the term "earning", the term "diamond" is ranked higher than the term "earning", see OPERATION 518.

From RANK TERMS BASED ON ENHANCED TERM WEIGHTS OPERATION 518, flow moves, optionally, to a DISPLAY ENHANCED TERM RANKING OPERATION 520. In DISPLAY ENHANCED TERM RANKING OPERATION 520, the terms as ranked in RANK TERMS BASED ON ENHANCED TERM WEIGHTS OPERATION 518 are displayed, for example, on display device 132 of server system 130. From DISPLAY ENHANCED TERM RANKING OPERATION 520, flow moves to and exits at an EXIT OPERATION 522.

Figure 6:
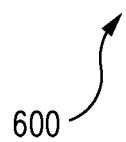
FIG. 6 is a diagram of enhanced term ranking as displayed in a DISPLAY ENHANCED TERM RANKING OPERATION of the enhance term weights based on custodian ranking process of FIG. 5 in accordance with one embodiment.

FIG. 6 is a diagram 600 of enhanced term ranking as displayed in DISPLAY ENHANCED TERM RANKING OPERATION 520 of enhance term weights based on custodian ranking process 500 of FIG. 5 in accordance with one embodiment.

Recall that in the simple illustration above, the term "diamond" is ranked higher than the term "earning". Further, assume that the normalized enhanced term weight of the term "diamond" is 1.0 and the normalized enhanced term weight of the term "earning" is 0.7. As illustrated in FIG. 6, the terms "diamond" and "earning" are displayed in order of their respective enhanced term rankings along with their associated respective normalized enhanced term weights. Accordingly, the term "diamond" is displayed first or at the top followed by the term "earning".

The enhanced terms ranking is then used to aid in e-discovery. For example, one or more concept searches are performed on terms selected using the enhanced terms ranking.

Referring again to FIG. 1, although enhanced e-discovery by custodian ranking application 106 is referred to as an application, this is illustrative only. Enhanced e-discovery by custodian ranking application 106 should be capable of being called from an application or the operating system. In one embodiment, an application is generally defined to be any executable code. Moreover, those of skill in the art having the benefit of this disclosure will understand that when it is said that an application or an operation takes some action, the action is the result of executing one or more instructions by a processor.

While embodiments have been described for a client-server configuration, an embodiment is carried out using any suitable hardware configuration or means involving a personal computer, a workstation, a portable device, or a network of computer devices. Other network configurations other than client-server configurations, e.g., peer-to-peer, web-based, intranet, cloud based, and internet network configurations, are used in other embodiments.

Herein, a computer program product comprises a tangible storage medium configured to store computer readable code in accordance with an embodiment. Some examples of computer program products are CD-ROM discs, DVDs, ROM cards, hard disks, floppy discs, magnetic tapes, computer hard drives, and servers on a network As illustrated in FIG. 1, this medium belongs to the computer system itself. However, the medium is also removed from the computer system. For example, enhanced e-discovery by custodian ranking application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer systems 102 and/or server system 130 is a portable computer, a workstation, a two-way pager, a cellular telephone, a digital wireless telephone, a personal digital assistant, a server computer, an Internet appliance, or any other device that includes components that execute enhanced e-discovery by custodian ranking application 106 in accordance with at least one of the embodiments as described herein. Similarly, in another embodiment, host computer systems 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, enhanced e-discovery by custodian ranking application 106 in accordance with one embodiment can be implemented in a wide variety of computer system configurations. In addition, enhanced e-discovery by custodian ranking application 106 could be stored as different modules in memories of different devices. For example, enhanced e-discovery by custodian ranking application 106 could initially be stored in server system 130, and as necessary, a portion of enhanced e-discovery by custodian ranking application 106 could be transferred to host computer system 102A and executed on host computer system 102A. Consequently, part of the enhanced e-discovery by custodian ranking functionality would be executed on processor 134 of server system 130, and another part would be executed on processor 108 of host computer system 102A. In view of this disclosure, those of skill in the art can implement various embodiments in a wide variety of physical hardware configurations using an operating system and computer programming language of interest to the user.

In yet another embodiment, enhanced e-discovery by custodian ranking application 106 is stored in memory 136 of server system 130. Enhanced e-discovery by custodian ranking application 106 is transferred over network 124 to memory 114 in host computer system 102A. In this embodiment, network interface 138 and I/O interface 110 would include analog modems, digital modems, or a network interface card. If modems are used, network 124 includes a communications network, and enhanced e-discovery by custodian ranking application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computing system implemented process comprising:
ranking, in the computing system, custodians of electronically stored information (ESI), wherein the custodians are ranked based upon custodian involvement with the ESI, wherein the custodian involvement with the ESI comprises different levels of custodian involvement each having an associated weight, wherein the custodian involvement associated with creating the ESI has a highest associated weight, and wherein the custodian involvement associated with a criteria that enhances the value of the ESI has a configurable weight;
calculating an item weight for an item of ESI based upon the custodian ranking; and
calculating a term weight for a term in the item of ESI based upon the item weight, wherein terms that appear in items that have a higher item weight based upon the custodian ranking are calculated to have a higher term weight than terms that appear in items that have a lower item weight based upon the custodian ranking.

2. The computing system implemented process of claim 1 wherein the ESI comprises an item, the ranking custodians comprising:
identifying a custodian that sent the item.

3. The computing system implemented process of claim 1 wherein the ESI comprises an item, the ranking custodians comprising:
identifying one or more custodians that received the item.

4. The computing system implemented process of claim 1 wherein the ESI comprises an item, the ranking custodians comprising:
identifying one or more custodians that are part of topic(s) of the item.

5. The computing system implemented process of claim 1 wherein the ESI comprises an item, the ranking custodians comprising:
identifying one or more custodians that are part of thread(s) of the item; and
identifying one or more custodians that meets specified criteria associated with the item.

6. The computing system implemented process of claim 1 wherein the ranking custodians comprises:
updating weights of the custodians for each item of ESI.

7. The computing system implemented process of claim 6 further comprising:
normalizing the weights of the custodians to form normalized weights, the normalized weights corresponding to a custodian ranking of the custodians.

8. The computing system implemented process of claim 7 further comprising displaying the custodian ranking.

9. The computing system implemented process of claim 1 further comprising identifying items of the ESI for selected custodians of the custodians.

10. A computing system implemented process comprising:
ranking, in the computing system, custodians of electronically stored information (ESI);
calculating an item weight for an item of ESI based upon the custodian ranking; and
enhancing a term weight for a term in the item based upon the item weight, wherein terms that appear in items that have a higher item weight based upon the custodian ranking are enhanced to have a higher term weight than terms that appear in items that have a lower item weight based upon the custodian ranking;
wherein the custodians are ranked based upon custodian involvement with the ESI, wherein the custodian involvement with the ESI comprises different levels of custodian involvement each having an associated weight, wherein the custodian involvement associated with creating the ESI has a highest associated weight, and wherein the custodian involvement associated with a criteria that enhances the value of the ESI has a configurable weight.

11. The computing system implemented process of claim 10 where the enhancing comprises:
for each term of the terms:
for each item of the ESI:
calculating a calculated weight for the item based on the custodian ranking of the item; and
enhancing the term weight using the calculated weight.

12. The computing system implemented process of claim 10 wherein the enhancing comprises:
selecting a first term of the terms;
selecting a first item of the ESI;
calculating a calculated weight for the first item based on the custodian ranking of custodians involved with the first item.

13. The computing system implemented process of claim 12 further comprising:
enhancing the term weight of the first term using the calculated weight.

14. The computing system implemented process of claim 13 wherein the enhancing the term weight of the first term using the calculated weight comprises:
increasing the term weight of the first term when the first item has a high calculated weight.

15. The computing system implemented process of claim 13 wherein the enhancing the term weight of the first term using the calculated weight comprises:
decreasing the term weight of the first term when the first item has a low calculated weight.

16. The computing system implemented process of claim 12 further comprising:
determining if there are additional items to be inspected for the first term, wherein upon a determination that there are additional items, selecting the next item.

17. The computing system implemented process of claim 16 wherein upon a determination that every item of the ESI has been inspected for the first term, the method further comprising:
determining whether there are additional terms to be ranked, wherein upon a determination that there are additional terms to be ranked, selecting the next term.

18. A computing system implemented process comprising:
ranking, in a computing system, custodians of electronically stored information (ESI), wherein the custodians are ranked based upon custodian involvement with the ESI, wherein the custodian involvement with the ESI comprises different levels of custodian involvement each having an associated weight, wherein the custodian involvement associated with creating the ESI has a highest associated weight, and wherein the custodian involvement associated with a criteria that enhances the value of the ESI has a configurable weight;

calculating an item weight for an item of ESI based upon the custodian ranking; and enhancing a term weight for a term in the item based upon the item weight, wherein terms that appear in items that have a higher item weight based upon the custodian ranking are enhanced to have a higher term weight than terms that appear in items that have a lower item weight based upon the custodian ranking.

19. The computing system implemented process of claim 18 wherein the ranking comprises:

determining an involvement of each custodian with the ESI, wherein a first custodian that has more involvement with the ESI than a second custodian has a higher custodian ranking than the second custodian.

20. The computing system implemented process of claim 19 wherein the first custodian was involved with a first item of the ESI and the second custodian was involved with a second item of the ESI, the enhancing term weights comprising:

giving a first term that appears in the first item more term weight than a second term appearing in the second item.

* * * * *